(12) United States Patent
Kimura

(10) Patent No.: US 6,885,486 B2
(45) Date of Patent: Apr. 26, 2005

(54) SCANNING OPTICAL SYSTEM AND IMAGE FORMING APPARATUS USING THE SAME

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 10/658,397

(22) Filed: Sep. 10, 2003

(65) Prior Publication Data

US 2004/0051922 A1 Mar. 18, 2004

(30) Foreign Application Priority Data

Sep. 17, 2002 (JP) .................................... 2002-269848

(51) Int. Cl.[7] .............................................. G02B 26/08
(52) U.S. Cl. ..................... 359/205; 359/204; 359/216; 347/244; 347/259
(58) Field of Search ............................... 359/204–207, 359/212, 216–219, 17, 566, 569, 563; 347/232, 233, 244, 258–260

(56) References Cited

U.S. PATENT DOCUMENTS

| | | | | |
|---|---|---|---|---|
| 6,215,574 | B1 | * 4/2001 | Toyoda | ........................ 359/207 |
| 6,222,661 | B1 | 4/2001 | Takeuchi et al. | ............ 359/205 |
| 2002/0179827 | A1 | 12/2002 | Kimura | |

FOREIGN PATENT DOCUMENTS

| | | |
|---|---|---|
| JP | 11218699 | 8/1999 |
| JP | 2000206445 | 7/2000 |

OTHER PUBLICATIONS

E. Grann, et al., "Artificial uniaxial and biaxial dielectrics with use of two-dimensional subwavelength binary gratings", J. Opt. Soc. Am., vol. 11, No. 10, pp. 2695 to 2703 (1994).
"Principle of Optics III", Tokai University Press, p. 1030, no date.
"Principle of Optics III", Tokai University Press, p. 1030 (with English-language translation), no date.

* cited by examiner

Primary Examiner—James Phan
(74) Attorney, Agent, or Firm—Fitzpatrick, Cella, Harper & Scinto

(57) ABSTRACT

Provided is a scanning optical system in which the influence of structural birefringence resulting from a relationship between the arrangement direction of a fine grating structure and polarization planes is reduced to obtain a preferable optical performance, and an image forming apparatus using the scanning optical system. In the scanning optical system, a light flux emitted from a light source unit is deflected by a deflection unit. The light flux deflected by the deflection unit is guided onto a surface to be scanned by a scanning optical unit having a fine structural grating on at least one optical surface. The surface to be scanned is scanned with the light flux. The fine structural grating has a triangular grating in which triangular grating parts are arranged in one dimensional direction. When a grating height of a triangular structure of the triangular grating is given by h, a grating pitch thereof is given by P, and a wavelength of the light flux emitted from the light source unit is given by $\lambda$, conditions of $0.23\lambda \leq h$ and $0.52 < h/P$ are satisfied.

11 Claims, 13 Drawing Sheets

SCANNING OPTICAL SYSTEM AND IMAGE FORMING APPARATUS USING THE SAME

BACKGROUND OF THE INVENTION

1. Field of the Invention

The present invention relates to a scanning optical system and an image forming apparatus using the same. In particular, the present invention relates to a scanning optical system suitable for an image forming apparatus using an electrophotographic process, such as a laser beam printer, a digital copying machine, or a multifunction printer, in which a light flux emitted from a light source unit is reflected and deflected by a polygon mirror serving as an optical deflector, and then a surface to be scanned is scanned with the light flux through a scanning optical unit including an optical element which has an fθ characteristic and is provided with a fine structural grating, to thereby record image information.

2. Related Background Art

In a conventional scanning optical system such as a laser beam printer (LBP), light fluxes which have been optically modulated in accordance with an image signal and emitted from the light source are periodically deflected by an optical deflector composed of a polygon mirror, for example. The light fluxes are converged on a surface of a photosensitive recording medium in a spot shape by a scanning optical unit having an fθ characteristics, and then the surface of the recording medium is optically scanned with the deflected light fluxes to carry out image recording.

FIG. 13 is a main part sectional view showing a conventional scanning optical system (scanning optical apparatus) in a main scanning direction (main scanning sectional view).

In FIG. 13, a light source unit 91 is composed of, for example, a semiconductor laser. A collimator lens 92 converts a divergent light flux emitted from the light source unit 91 into a substantially parallel light flux. An aperture diaphragm 93 limits a passing light flux to shape a beam form. A cylindrical lens 94 has a predetermined power only in a sub scanning direction and images the light flux passing through the aperture diaphragm 93 as an almost linear image on a deflection surface (reflection surface) 95a of an optical deflector 95 described later within the sub scanning cross section.

The optical deflector 95 serving as a deflection unit is composed of, for example, a polygon mirror (rotating polygonal mirror) having four surfaces and is rotated in a direction indicated by an arrow "A" in FIG. 13 at a constant rate by a driving unit such as a motor (not shown).

A scanning lens system 96 serving as a scanning optical unit having a collecting function and an fθ characteristic is composed of first and second scanning lenses 96a and 96b. The scanning lens system has a tilt correction function, which is obtained when the light flux related to image information, which is reflected and deflected on the optical deflector 95 is imaged on a photosensitive drum surface 97 that is a surface to be scanned, and a conjugate relationship is made between the deflection surface 95a of the optical deflector 95 and the photosensitive drum surface 97 within the sub scanning section.

As shown in FIG. 13, the divergent light flux emitted from the semiconductor laser 91 is converted into the substantially parallel light flux by the collimator lens 92. The substantially parallel light flux (the amount of light) is limited by the aperture diaphragm 93 and incident into the cylindrical lens 94. Of the substantially parallel light flux incident into the cylindrical lens 94, a light flux in the main scanning section is exited without changing an optical state. In addition, a light flux within the sub scanning section is converged and imaged as an almost linear image (line image extending in the main scanning direction) on the reflection surface 95a of the optical deflector 95. The light flux which is reflected and deflected on the reflection surface 95a of the optical deflector 95 is imaged on the photosensitive drum surface 97 in a spot shape through the first. and the second scanning lenses 96a and 96b. At this time, the optical deflector 95 is rotated in the direction indicated by the arrow "A", so that the photosensitive drum surface 97 is scanned with the light flux in a direction indicated by an arrow "B" (main scanning direction) at a constant speed. Therefore, images are recorded on the photosensitive drum surface 97 of the photosensitive drum serving as a recording medium.

However, the above-mentioned conventional scanning optical system has the following problems.

In recent years, a scanning optical unit of the scanning optical system (scanning lens system) has been generally produced using plastic that is convenient to form an aspheric surface shape. In addition, the plastic is easy to manufacture. However, with respect to a plastic lens, it is difficult to apply antireflection coating on the lens surface from technical and cost points of view. Therefore, Fresnel reflection is unavoidably caused on each optical surface.

FIG. 14 is an explanatory graph showing angle dependences to transmittance and reflectance when a P polarized light flux is made incident into a resin optical member having, for example, a refractive index n=1.524. As shown in FIG. 14, surface reflection on each optical surface becomes. larger as an incident angle increases.

Accordingly, in general, when the light flux is shifted from an on-axis position to an off-axis position in the scanning optical unit, the incident angle thereof changes. Fresnel reflection on each optical surface greatly changes, with the result that a difference of the amount of light is produced between the on-axis position and the off-axis position. When the incident angle is increased from 0 degrees to a Brewster angle, the reflectance reduces (transmittance increases), so that the transmittance of the entire system increases from the on-axis position toward the off-axis position. That is, in an illumination distribution on a surface to be scanned, the amount of light increases from the on-axis position toward the off-axis position. As is apparent from FIG. 14, the amount of light at a most off-axis position is increased by about 4% of the amount of light at the on-axis position. As a result, there is a problem in that a difference of density is produced between a central region and a peripheral region on an image outputted from an image forming apparatus.

In order to solve the problem, according to Japanese Patent Application Laid-Open No. 2000-206445, diffraction efficiency on the surface of a diffraction grating provided in a scanning optical unit is set as appropriate. That is, in order to conduct magnification chromatic aberration correction and focusing correction, the grating is formed with desirable pitch for desirable power distribution and a height (depth) of the grating on the diffraction grating surface is set as appropriate. Therefore, diffraction efficiency of diffraction light (primary diffraction light) to be used is changed between the on-axis position and the off-axis position, so that a change in diffraction efficiency cancels a change in transmittance on another refraction surface.

However, the diffraction grating as disclosed in the Japanese Patent Application Laid-Open No. 2000-206445 has the following problem.

When the pitch of the grating becomes extremely small, and a fine structural grating having a grating pitch substantially equal to or less than the wavelength of light is obtained, it is known that the fine structural grating has structural birefringence.

According to "Principle of Optics III" published by Tokai University Press, p.1030, when optically isotropic substances are regularly arranged as particles which are sufficiently larger than a molecule and smaller than the wavelength of light, the fine structural grating acts as the structural birefringence. That is, as described in "Principle of Optics III", a model such as an aggregate of thin parallel plates having periodicity equal to or less than the order of the wavelength of light becomes uniaxial crystal in which effective permittivities obtained from permittivity of a medium in a plate region and permittivity of a medium in a non-plate region separately act on an electrical vector parallel to the plate and an electrical vector perpendicular to the plate.

In other words, in the fine structural grating having the grating pitch substantially equal to or less than the wavelength of light, different reflectances are exhibited with respect to two axes which respectively correspond to an arrangement direction of grating and a direction perpendicular to the arrangement direction of the grating, according to a direction of a polarization plane of an incident light flux.

Further, as described in, for example, Japanese Patent Application Laid-Open No. 11-218699, according to a beam combining method in which linearly polarized laser light fluxes on two different optical paths are combined by a polarized beam splitter, reflected and deflected by an optical deflector, and imaged on a surface to be scanned by scanning using an imaging optical element, the light flux having two polarization states is incident into the imaging optical element. If the fine structural grating having the structural birefringence as described above is provided in such a scanning optical system, transmittance and reflectance characteristics are changed according to the polarization states. As a result, there is a problem in that a difference in light amount is produced between a plurality of laser light fluxes on an image surface, so that uniform exposure cannot be conducted.

SUMMARY OF THE INVENTION

An object of the present invention is to provide a scanning optical system in which the influence of structural birefringence of a fine structural grating provided on an optical surface of a scanning optical unit is reduced to obtain preferable optical characteristics regardless of polarization states of an incident light flux, and an image forming apparatus using the scanning optical system.

Also, another object of the present invention is to provide a scanning optical system capable of reducing Fresnel (surface) reflection on a lens surface which causes flare and ghost without providing an additional step such as coating, and an image forming apparatus using the scanning optical system.

To solve the above-mentioned problems, a scanning optical system according to an aspect of the present invention includes:

a light source unit for emitting a light flux;

a deflection unit for deflecting the light flux emitted from the light source unit; and a scanning optical unit for guiding the light flux deflected by the deflection unit onto a surface to be scanned and scanning the surface, the scanning optical unit including a fine structural grating on at least one optical surface thereof, in which the fine structural grating has a triangular grating in which a plurality of triangular grating parts are arranged in one dimensional direction, and in which when a grating height of a triangular structure of the triangular grating is given by h, a grating pitch thereof is given by P, and a wavelength of the light flux emitted from the light source unit is given by $\lambda$, conditions of $$0.23\lambda \leq h \text{ and}$$

$$0.52 < h/P$$

are satisfied.

It is preferable in the above invention that a light flux incident into the fine structural grating is substantially P polarized light.

It is preferable in the above invention that when a light flux incident into the fine structural grating is substantially S polarized light, conditions of $$0.35\lambda \leq h \text{ and}$$

$$0.80 < h/P$$

are satisfied.

A scanning optical system according to another aspect of the present invention includes:

a light source unit for emitting a plurality of light fluxes;

a deflection unit for deflecting the plurality of light fluxes emitted from the light source unit; and a scanning optical unit for guiding the plurality of the light fluxes deflected by the deflection unit onto a surface to be scanned and scanning the surface, the scanning optical unit including a fine structural grating on at least one optical surface thereof, in which the fine structural grating has a triangular grating where a plurality of triangular grating parts are arranged in one dimensional direction, and in which when a grating height of a triangular structure of the triangular grating is given by h, a grating pitch thereof is given by P, and a shortest wavelength of wavelengths of the plurality of light fluxes emitted from the light source unit is given by $\lambda\min$, conditions of $$0.23\lambda\min \leq h \text{ and}$$

$$0.52 < h/P$$

are satisfied.

It is preferable in the above invention that a light flux incident into the fine structural grating is substantially P polarized light.

It is preferable in the above invention that when a light flux incident into the fine structural grating is substantially S polarized light, conditions of $$0.35\lambda\min \leq h \text{ and}$$

$$0.80 < h/P$$

are satisfied.

It is preferable in the above invention that:

the light source unit includes a plurality of light source sections for emitting different polarized light fluxes;

the scanning optical system further includes a beam combining unit for combining the different polarized light fluxes on optical paths, the beam combining unit being located between the light source unit and the deflection unit; and conditions of $$0.35\lambda\min \leq h$$

$$0.80 < h/P$$

are satisfied.

An image forming apparatus according to a further aspect of the present invention includes:

the above-mentioned scanning optical system;

a photosensitive member located on a surface to be scanned;

a developing unit for developing as a toner image an electrostatic latent image formed on the photosensitive member by the light flux for scanning from the scanning optical system;

a transferring unit for transferring the developed toner image to a material to be transferred; and a fixing unit for fixing the transferred toner image to the material to be transferred.

An image forming apparatus according to a further aspect of the present invention includes:

the above-mentioned scanning optical system; and a print controller for converting code data inputted from an external device into an image signal and inputting the image signal to the scanning optical system.

A color image forming apparatus according to a further aspect of the present invention includes:

a plurality of scanning optical systems described above; and a plurality of image bearing members, each of which is located on a surface to be scanned, of a corresponding scanning optical system, the plurality of image bearing members forming images having colors different from one another.

It is preferable in the above invention that the color image forming apparatus further includes a print controller for converting a color signal inputted from an external device into image data corresponding to different colors and for inputting the image data to the respective scanning optical systems.

DESCRIPTION OF THE PREFERRED EMBODIMENTS (First Embodiment)

Figure 1:
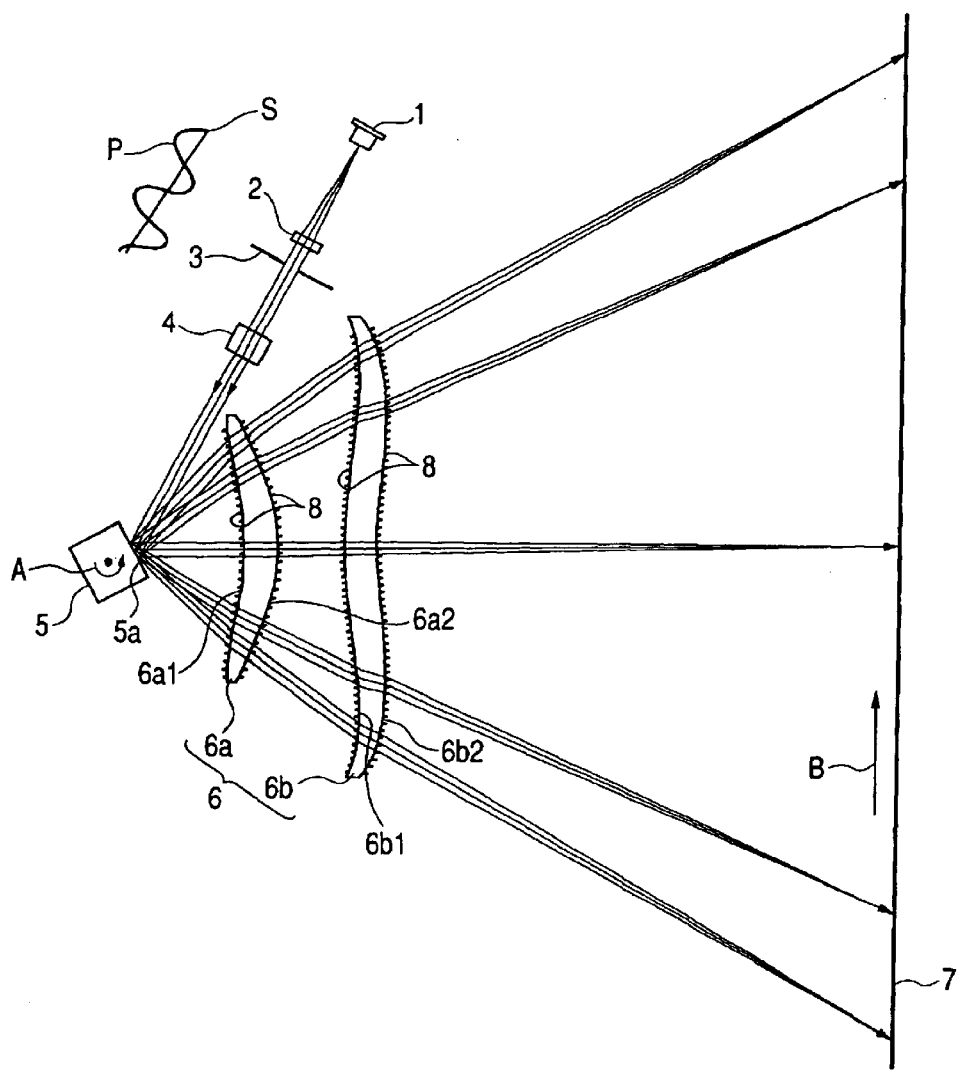
FIG. 1 is a main scanning sectional view according to a first embodiment of the present invention.
Figure 2:
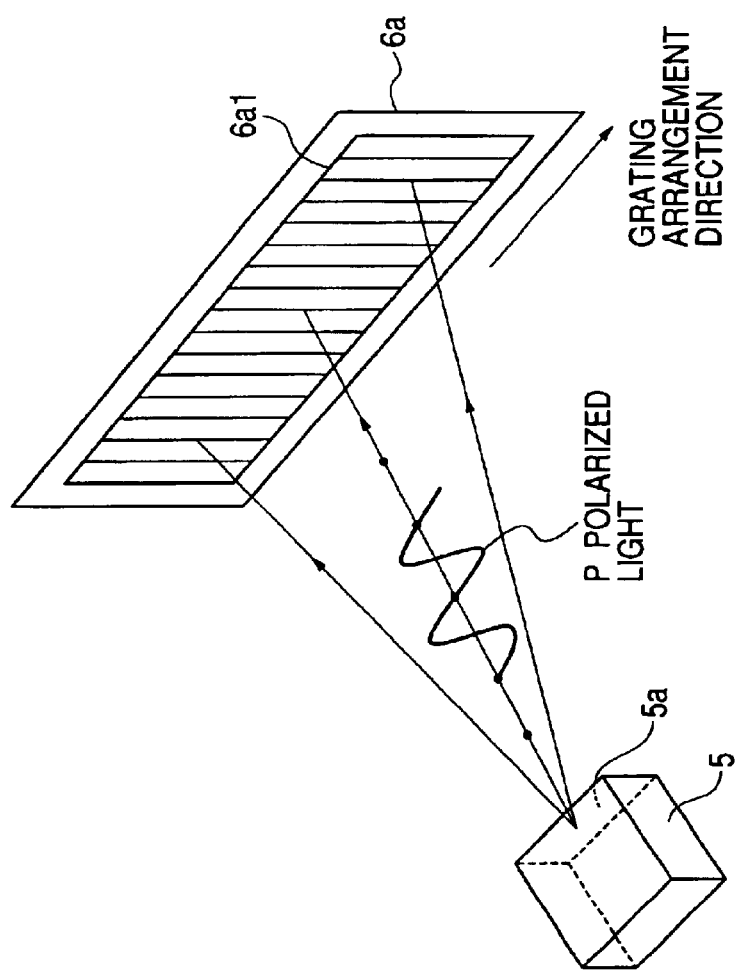
FIG. 2 is a main part schematic view showing a light flux incident into a fine structural grating according to the first embodiment of the present invention.

A first embodiment of the present invention will be described with reference to FIGS. 1 to 6. FIG. 1 is a main part sectional view in a main scanning direction (main scanning sectional view), showing a scanning optical system (scanning optical apparatus) according to the first embodiment of the present invention. FIG. 2 is a main part schematic view showing a light flux (P polarized light) incident into a fine structural grating.

Here, the main scanning direction indicates a direction perpendicular to the rotational axis of a deflection unit (direction of a light flux which is reflected and deflected (which is deflected for scanning) by the deflection unit). A sub scanning direction indicates a direction parallel to the rotational axis of the deflection unit. In addition, a main scanning section indicates a plane which is parallel to the main scanning direction and includes the optical axis of the scanning optical unit. A sub scanning section indicates a plane perpendicular to the main scanning section.

In FIGS. 1 and 2, a laser light source 1 as a light source unit is composed of, for example, a semiconductor laser. A collimator lens 2 converts a divergent light flux emitted from the laser light source 1 into a substantially parallel light flux. Note that a system that converts the light flux into the substantially parallel light flux within the main scanning section is used in this embodiment. The present invention is not necessarily limited to such a system. The light flux may be converted into a substantially convergent light flux or a substantially divergent light flux.

An aperture diaphragm 3 limits a passing light flux to shape a beam form. A cylindrical lens (lens system) 4 has predetermined power in only the sub scanning direction. The light flux passing through the aperture diaphragm 3 is imaged as an almost linear image on a reflection surface 5a of an optical deflector 5 (described later) within the sub scanning section.

The optical deflector 5 as the deflection unit is composed of, for example, a polygon mirror having four surfaces (rotating polygonal mirror) and rotated in a direction indicated by an arrow "A" in FIG. 1 at a constant rate by a drive unit such as a motor (not shown).

A scanning lens system 6 is the scanning optical unit having a condensing function and an fθ characteristic. The scanning lens system 6 is composed of two lenses, a first and a second scanning lenses 6a and 6b, each of which includes at least one optical surface having a fine structural grating and is made of a plastic material. In addition, the scanning lens system 6 has a tilt correction function in which a light flux related to image information which is reflected and deflected by the optical deflector 5 is imaged onto a photosensitive drum surface 7 as a surface to be scanned, and a conjugate relationship is made between the reflection surface 5a of the optical deflector 5 and the photosensitive drum surface 7 within the sub scanning section.

Note that the light flux emitted from the light source unit 1 may be directly made incident to the deflection unit 5 without using the above-mentioned optical elements 2, 3, and 4.

Each of the lens surfaces of the first and the second scanning lenses 6a and 6b in this embodiment is formed in a curved shape such as a spherical shape or an aspherical shape within the main scanning section as shown in FIG. 1. In addition, each of those lens surfaces is formed in a base shape such as a known special aspherical shape in which curvature is changed from an on-axis (scanning center) position toward an off-axis (scanning periphery) position, within the sub scanning section perpendicular to the main scanning section. In this embodiment, a fine structural grating 8 made of a transparent resin material or a glass material as described later is formed on an entire incident surface 6a1 and an entire exit surface 6a2 of the first scanning lens 6a and an entire incident surface 6b1 and an entire exit surface 6b2 of the second scanning lens 6b.

In this embodiment, the divergent light flux emitted from the laser light source 1 is converted into a substantially parallel light flux by the collimator lens 2. The substantially parallel light flux (the amount of light) is limited by the aperture diaphragm 3 and then incident into the cylindrical lens 4. Of the substantially parallel light flux incident into the cylindrical lens 4, a light flux in the main scanning section is exited without changing an optical state. A light flux within the sub scanning section is converged and imaged as an almost linear image (line image extending in the main scanning direction) on the reflection surface 5a of the optical deflector 5.

Then, the light flux which is reflected and deflected on the reflection surface 5a of the optical deflector 5 is imaged on the photosensitive drum surface 7 in a spot shape through the first and the second scanning lenses 6a and 6b. At this time, the optical deflector 5 is rotated in the direction indicated by the arrow "A", so that the photosensitive drum surface 7 is scanned with the light flux in a direction indicated by an arrow "B" (main scanning direction) at a constant speed. Therefore, images are recorded on the photosensitive drum surface 7 of the photosensitive drum as a recording medium.

In FIG. 1, a light flux having a polarization plane within the paper surface (surface to be scanned) with respect to the scanning lens system 6 is P polarized light. A light flux having a polarization plane in a direction perpendicular to the paper surface is S polarized light.

In this embodiment, the laser light source 1 is disposed such that almost all light fluxes incident into the scanning lens system 6 are incident as the P polarized light having the polarization plane within the paper surface (polarization plane is within the paper surface). That is, the laser light source 1 is disposed such that the horizontal transverse mode direction thereof becomes substantially parallel to the surface to be scanned 7.

Here, "almost all" indicates "90% or more" of all light fluxes.

Figure 3:
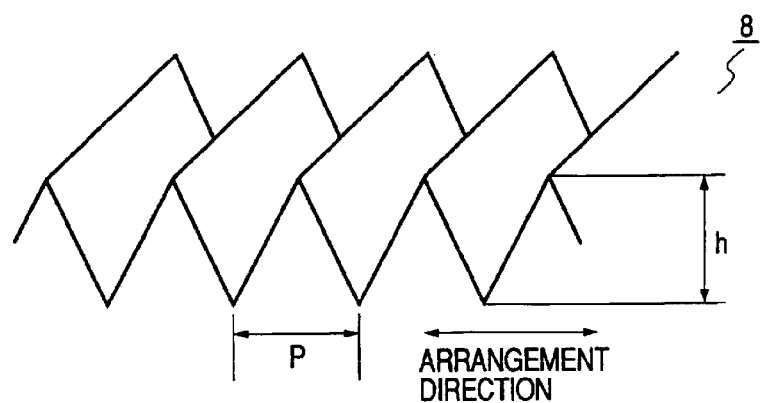
FIG. 3 is an enlarged view of the fine structural grating according to the first embodiment of the present invention.
Figure 4:
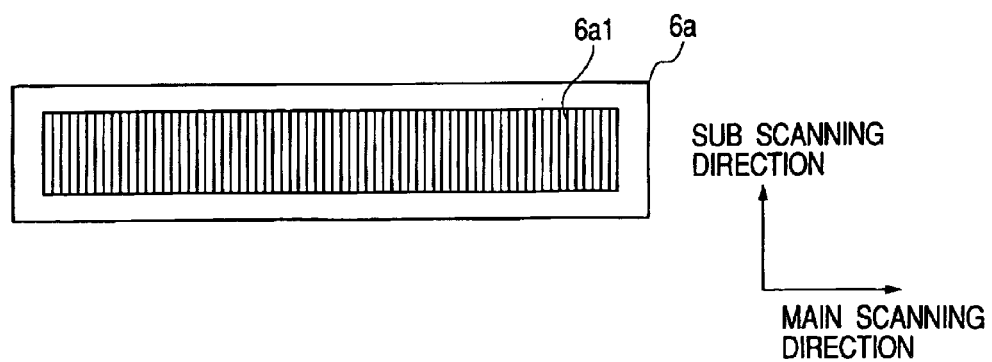
FIG. 4 shows an arrangement direction of the fine structural grating according to the first embodiment of the present invention.

In this embodiment, as described above, the special aspherical shape is used as the base shape and the fine structural grating 8 as shown in FIGS. 3 and 4 is formed on the entire incident surface 6a1 and the entire exit surface 6a2 of the first scanning lens 6a and the entire incident surface 6b1 and the entire exit surface 6b2 of the second scanning lens 6b in the scanning lens system 6. Accordingly, it is targeted that reflection light on each of the incident and exit surfaces is reduced, thereby suppressing a variation in the amount of transmitting light due to a change in angle of view.

Note that, in this embodiment, the fine structural grating 8 may be provided on one optical surface having the maximum influence on ghost light and flare light that reach the surface to be scanned 7. (such as a surface in which an incident angle is maximum). In addition to this, one or plural fine structural gratings 8 may be provided. The surface on which the fine structural grating 8 is provided may be a spherical surface or an aspherical surface. In addition, the surface on which the fine structural grating 8 is provided may be a curved surface, a diffraction surface, or a flat surface, which are rotationally asymmetrical.

As shown in FIG. 3, in the fine structural grating 8, triangular grating parts, each of which has a sectional shape of a triangle (including a sawtooth form and a right triangle) are arranged in one dimensional direction (main scanning direction), thereby becoming a triangular grating having a repetition structure. A grating arrangement direction is defined as a direction in which the tops (or the bottoms) of the triangular grating parts are repeatedly arranged. In FIG. 3, a horizontal direction (longitudinal direction) indicates an arrangement direction.

As shown in FIG. 3, a grating pitch P corresponds to a length of the bottom side of the triangular grating part. In this embodiment, when a height from the top of the triangular grating part to the bottom thereof (grating height) is given by h and a wavelength of a light flux emitted from the light source unit 1 is given by $\lambda$, respective elements are set so as to satisfy the following conditions of $$0.23\lambda \leq h \quad (1) \text{ and}$$

$$0.52 < h/P \quad (2).$$

Note that the fine structural grating 8 may be integrally formed with a substrate composing an optical surface (glass substrate or transparent resin substrate).

Also, as shown in FIG. 4, the grating arrangement direction in the fine structural grating 8 is set to a predetermined direction. FIG. 4 shows the fine structural grating 8 when the incident surface 6a1 of the first scanning lens system 6a is viewed from the optical deflector 5 side. In FIG. 4, the tops and the bottoms of the triangular grating parts are exaggeratedly shown. With respect to the entire incident surface 6a1 of the first scanning lens 6a, the tops and the bottoms of the triangular grating parts are extended in a direction parallel to the sub scanning direction of the first scanning lens 6a and arranged in the main scanning direction thereof.

In the fine structural grating 8, the grating pitch P that satisfies a condition related to a so-called zero order grating is selected. The fine structural grating 8 is called a SWS (subwave structure). The grating pitch thereof is equal to or less than the order of the wavelength of the used light source, and it is intended to use zero order light without a diffraction action.

The zero order grating is a grating of periodic fine structural gratings, in which diffraction light other than zero order light is not produced (see Optical Society of America, Vol. 11, No. 10/October, 1994/J. Opt. Soc. Am., A, p.2695).

In general, in the periodic structural grating, diffraction light is produced at a diffraction angle that satisfies a conditional expression of diffraction, $$P(Ns \cdot \sin \theta m \cdot Ni - \sin \theta i) = m\lambda \quad (a)$$

where P: a grating pitch,

Ni: a refraction index (of a medium of a structural grating) in an incident side, θi: an incident angle, θm: a diffraction angle of an m-th order, Ns: a refraction index (of a medium of the structural grating) in an exit side, m: a diffraction order, and λ: a use wavelength.

As is apparent from the conditional expression (a), a diffraction angle is $\theta m \geq \theta_1$ (m=1). Optical Society of America as described above discloses that, a condition in which diffraction light of +1st order is not produced in the case of vertical incidence is $$\theta_{+1} \geq 90°  \quad (b).$$

Therefore, $$P < \lambda/(Ns + Ni \cdot \sin \theta i)  \quad (c)$$

is a condition of the zero order grating.

Note that, in the case of the most off-axis position, $\theta_{+1}$ becomes 90° or more and the grating pitch P becomes a smaller pitch Pa. When the incident angle is other than 0 degrees, it is necessary to further reduce the grating pitch P.

Figure 5:
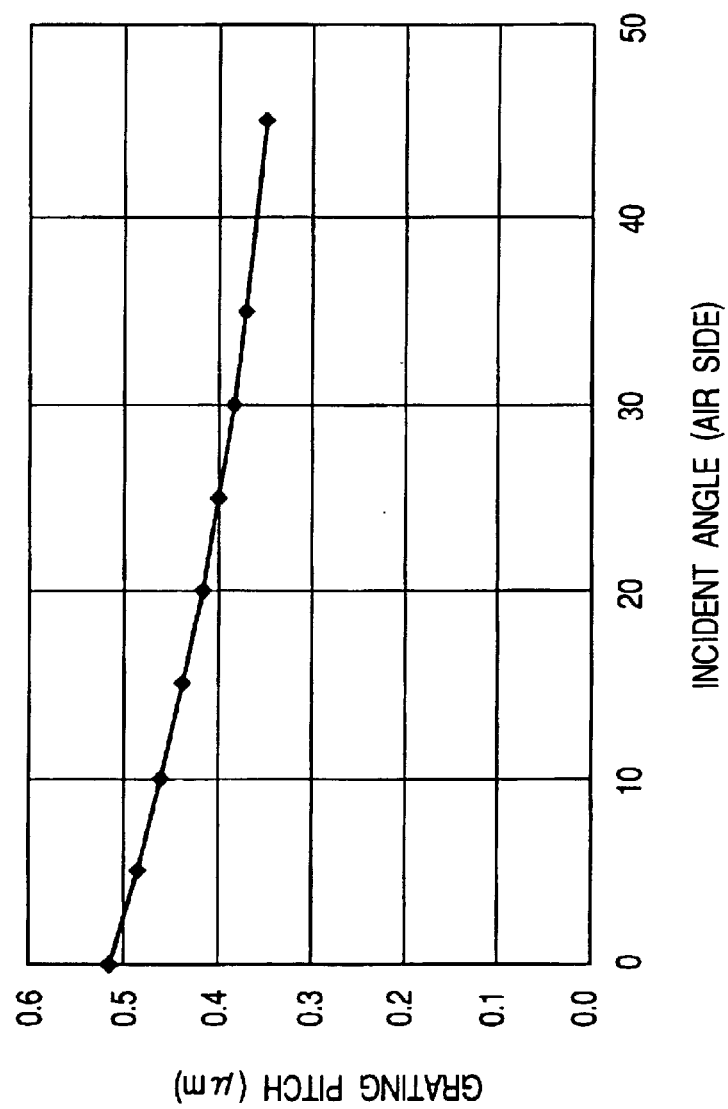
FIG. 5 shows a relationship between a grating pitch and an incident angle according to the first embodiment of the present invention.

FIG. 5 is an explanatory graph showing the optimum grating pitch P to the incident angle θi when a refraction index n of a lens material is set to 1.524 and the use wavelength λ is set to 780 nm. The graph indicates a maximum pitch that satisfies the zero order grating. If the grating pitch is equal to or smaller than the maximum pitch, diffraction light other than zero order is not produced. Therefore, in the case of the incident angle θi of zero, that is, in the case of vertical incidence, if the grating pitch P of the fine structural grating is 0.5 μm, it is apparent that the fine structural grating acts as the zero order grating.

However, in the case of the incident angle θi of 45°, a condition of the zero order grating is not satisfied when the grating pitch P of the fine structural grating is 0.5 μm. With respect to the zero order grating in the case of the incident angle θi of 45°, as is apparent from FIG. 5, it is required that the grating pitch P is smaller than 0.35 μm.

According to the scanning optical system as in this embodiment, with respect to the surfaces of the respective lenses of the scanning lens system 6, that is, the incident surface 6a1 and the exit surface 6a2 of the first scanning lens 6a and the incident surface 6b1 and the exit surface 6b2 of the second scanning lens 6b, the incident angle θi of an incident light flux is determined at a position y on each of the lens surfaces. Accordingly, a maximum pitch that satisfies the zero order grating can be determined at each location on each of the lens surfaces.

In other words, when a grating pitch determined in the case where a maximum incident angle at the time of incidence of a light flux into the fine structural grating 8 is given by θymax is given by Pymax, the fine structural grating 8 is preferably constructed by the grating pitch P that satisfies $$P < Pymax  \quad (d).$$

Therefore, if the maximum incident angle θymax is set to 45°, Pymax is nearly equal to 0.35 μm. Accordingly, the grating pitch P equal to or less than such a value may be selected.

Figure 6:
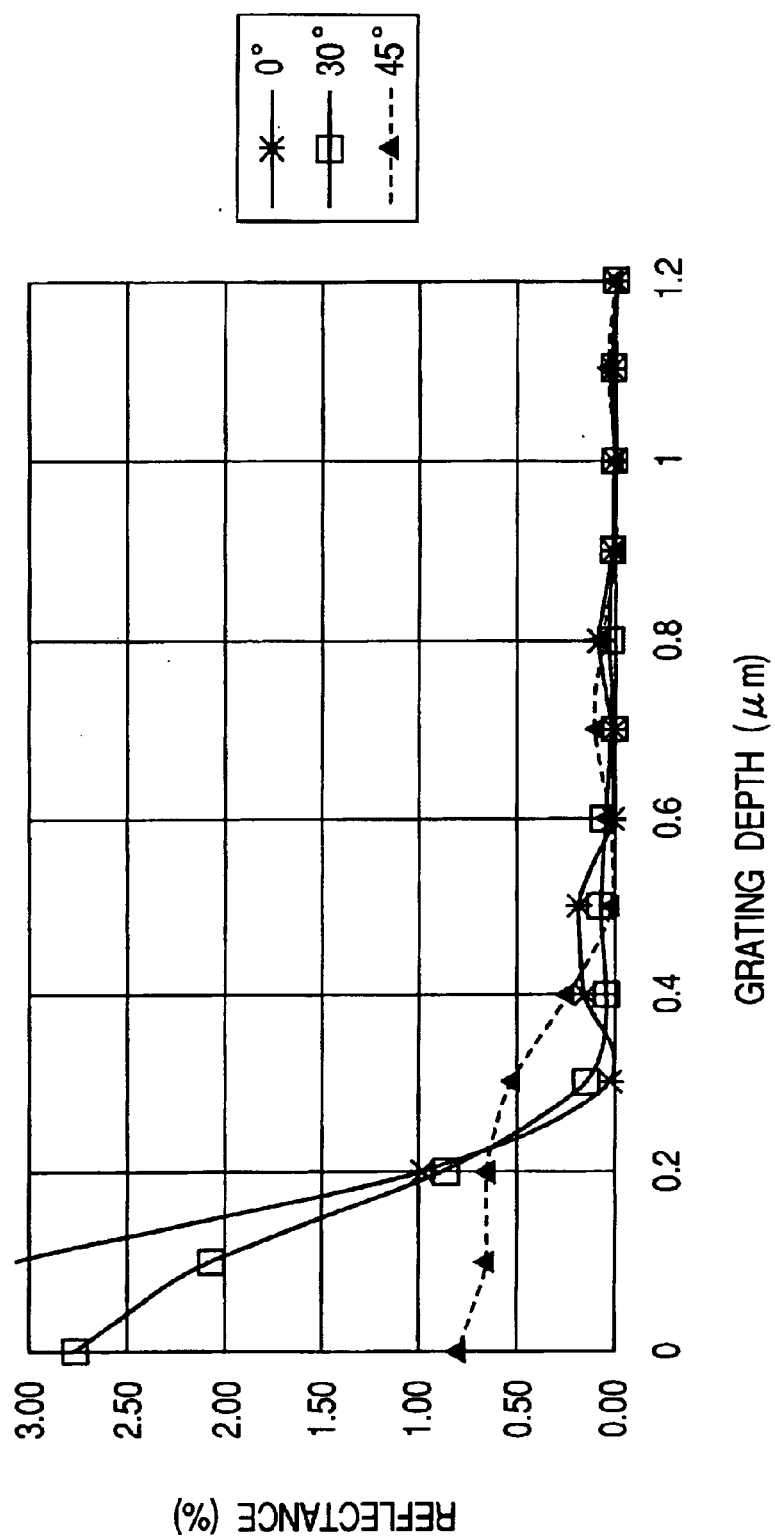
FIG. 6 shows an optical characteristic (P polarized light) according to the first embodiment.

Next, the grating height h of the above-mentioned triangular grating will be described with reference to FIG. 6. Here, a change in reflectance when the grating pitch P of the triangular grating is kept to 0.35 μm and the grating height h is changed is simulated. FIG. 6 shows a simulation result in the case where the P polarized light flux (the light flux having the polarization plane in a direction perpendicular to the paper surface in FIG. 1) is incident into the scanning lens system 6 at the incident angles θ=0°, 30°, and 45°.

As is apparent from the result, reflectance is very large with respect to light fluxes at θ=0° and 30° in the case of h<0.2 μm, and in the case where h is nearly equal to 0.2 μm, reflectance is reduced to 1% or less in which refection light can be substantially neglected. At this time, h=0.2 μm, P=0.35 μm, and λ=0.78 μm.

Therefore, h/λ is nearly equal to 0.25 and h/P is nearly equal to 0.57, so that the above-mentioned conditional expressions (1) and (2) are satisfied.

Also, as is apparent from FIG. 6, the performance is improved as the grating height h increases. In addition, as is apparent from FIG. 5, when the grating pitch is made larger than 0.35 μm, the fine structural grating does not function as the zero order grating. Accordingly, it is desirable that the grating pitch is equal to or smaller than 0.35 μm. Thus, it is apparent that the above-mentioned conditional expressions (1) and (2) are established.

Further, as is apparent from FIG. 6, in h≧0.3 μm, when θ is limited to a range of 0° to 45°, a preferable antireflection effect in which reflectance is 0.5% or less can be obtained, and when θ is limited to a range of 0° to 30°, a very preferable antireflection effect in which reflectance is 0.2% or less can be obtained. At this time, h=0.3 μm, P=0.35 μm, and λ=0.78 μm.

Therefore, h/λ becomes nearly equal to 0.38 and h/P becomes nearly equal to 0.86, thereby satisfying the above-mentioned conditional expressions (1) and (2).

In addition, as is apparent from FIG. 6, in h≧0.4 μm, reflectance becomes 0.2% or less when θ is in a range of 0° to 45°, so that an extremely preferable antireflection effect can be obtained. At this time, h=0.4 μm, P=0.35 μm, and λ=0.78 μm.

Therefore, h/λ becomes nearly equal to 0.51 and h/P becomes nearly equal to 1.14, thereby satisfying the above-mentioned conditional expressions (1) and (2).

Note that, in this embodiment, it is more preferable that the above-mentioned conditional expressions (1) and (2) are respectively changed to $$0.45\lambda \leq h  \quad (1a) \text{ and}$$

$$1.05 < h/P  \quad (2a).$$

Figure 7:
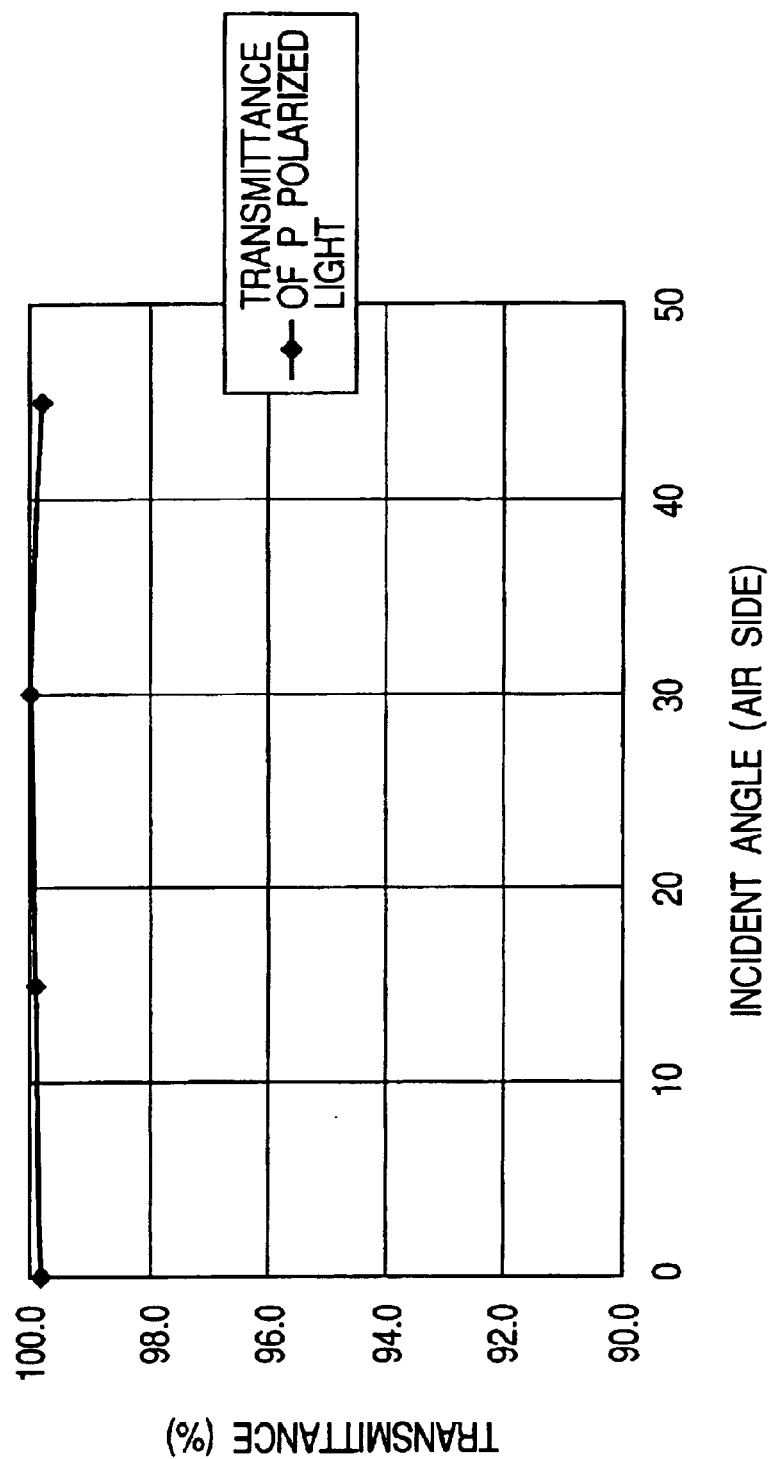
FIG. 7 shows a relationship between the incident angle and transmittance according to the first embodiment of the present invention.

In this embodiment, the fine structural grating is optimized such that a change in P polarized light transmittance of zero order light becomes smaller regardless of the incident angle. As a result, with respect to the shape of the fine structural grating, when the use wavelength λ is set to 0.78 μm and the refraction index n of a material of the scanning lens is set to 1.524, the grating pitch P of 0.35 μm and the grating height h of 0.4 μm are obtained. In such a grating shape, a transmittance characteristic to the incident angle is shown in FIG. 7.

Figure 14:
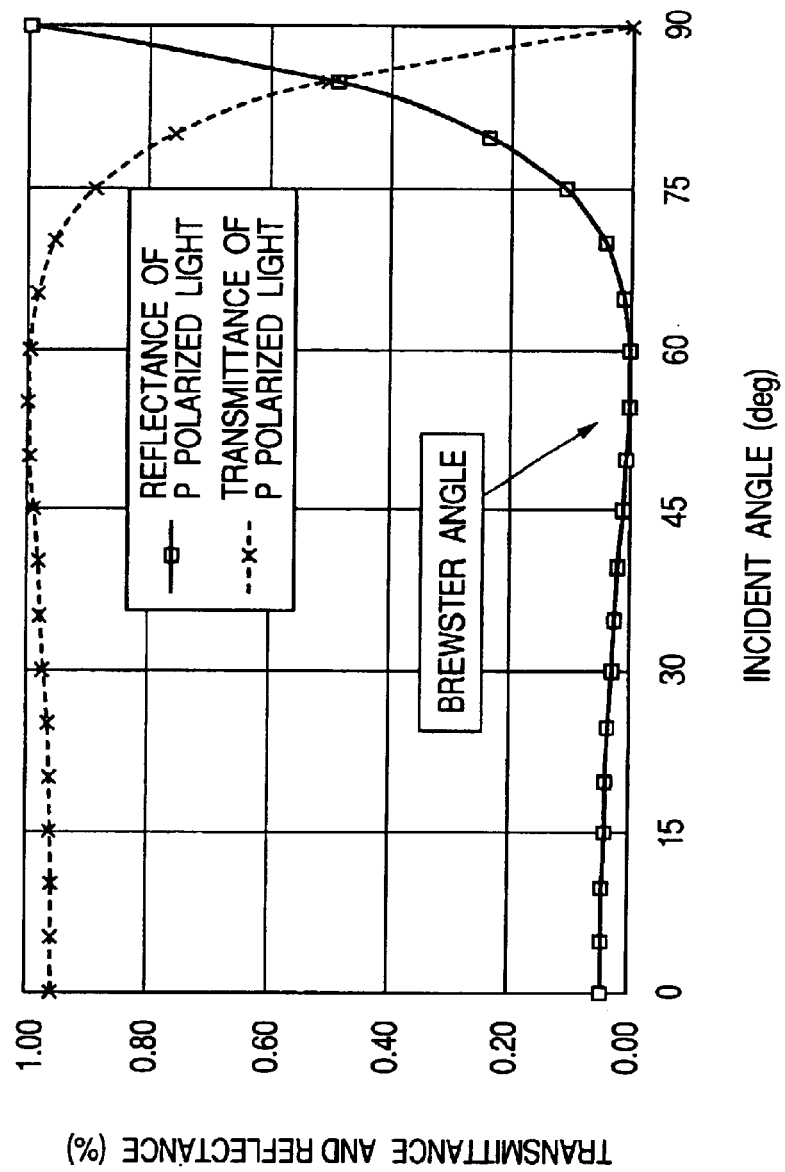
FIG. 14 is an explanatory graph showing incident angle dependences of P and S polarized light to reflectance and transmittance.

In other words, when the incident angle of light into the optical element is within a range of 0° to 45°, the transmittance is 99.8% or more, that is, Fresnel reflectance is up to 0.2%. Therefore, although the reflectance of the P polarized light in the conventional example as shown in FIG. 14 is about 4%, it is apparent that the reflectance is reduced to 1/20 or less, that is, to 1% or less at which the influence of flare on an image is slight.

In this embodiment, in order to reduce Fresnel reflection produced on each of the lens surfaces, the grating pitch and the height of the grating are determined according to an incident angle at a position in which a light flux reaching a predetermined image height transmits through the fine structural grating 8. Therefore, it is possible to provide a scanning optical system in which flare light and ghost light that reach the surface to be scanned 7 can be reduced, thereby outputting a preferable image.

In this embodiment, the triangular grating part having only the isosceles triangular shape is indicated. However, the present invention is not limited to such a shape. Even in a grating whose sectional shape is, for example, a sawtooth shape or a right triangle in which one of the base angles becomes a right angle, it can be simulated that the same characteristic is exhibited.

Note that, in this embodiment, each of the lens surfaces of the first and the second scanning lenses 6a and 6b is formed in the spherical shape or the aspherical shape within the main scanning section. In addition, the known special aspherical shape in which curvature is changed from the on-axis position toward the off-axis position within the sub scanning section is used as the base shape. However, the present invention is not necessarily limited to such a shape. In the case of a so-called fθ lens having a function for imaging, for example, a deflected light flux on the surface to be scanned in a spot shape and conducting optical scanning at a constant speed (fθ characteristic), other shapes may be used.

A forming method using an injection mold in which a fine structural grating shape is formed can be used as a method of forming a grating on the lens surface.

Also, in this embodiment, the scanning optical unit 6 is composed of the two lenses. However, the present invention is not limited to this. Therefore, the scanning optical unit may be composed of, for example, a single lens or three or more lenses. In addition, the fine structural grating is not necessarily formed on all the lens surfaces but may be selectively formed on only a surface in which the influence of flare or the like is large.

According to the description in this embodiment, the grating pitch is kept to 0.35 μm. However, the grating pitch is not necessarily kept constant. As indicated in the expression (d), it is preferable that the grating pitch is Pymax or less, and the pitch may be changed as appropriate within a range that satisfies the expression (d).

An upper limit value in the conditional expression (1) is not set. However, an increase in value tends to further improve a calculated optical performance. Note that the upper limit value becomes about 3λ due to the practical processing limitation of the grating.

An upper limit value in the conditional expression (2) is not set. However, an increase in value tends to further improve a calculated optical performance. Note that the upper limit value becomes about 10 due to the practical processing limitation of the grating.

(Second Embodiment)

Figure 8:
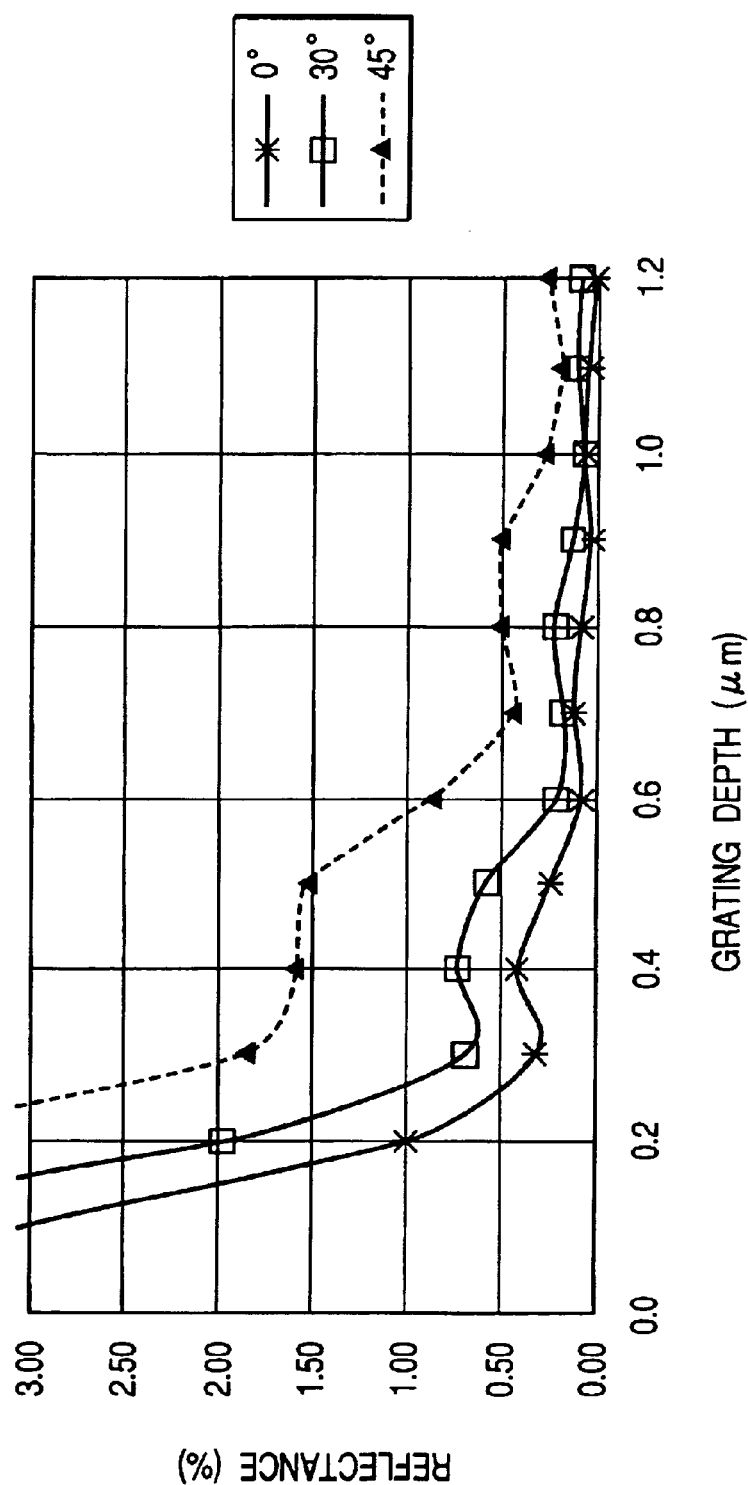
FIG. 8 shows an optical characteristic (S polarized light) according to a second embodiment.

Next, a second embodiment of the present invention will be described with reference to FIG. 8. FIG. 8 shows an optical characteristic (S polarized light) of the second embodiment of the present invention.

In this embodiment, structures different from the above-mentioned first embodiment are that (I) the light source unit 1 is placed such that a light flux incident into the scanning lens system 6 is mainly made incident as S polarized light and (II) the conditional expressions (3) and (4) related to the fine structural grating 8 are set according to the placement of the light source unit 1. Other structures and optical actions are substantially the same as the first embodiment, so that the same effect is obtained.

In other words, in this embodiment, when a light flux incident into the fine structural grating 8 is substantially S polarized light, respective elements are set so as to satisfy conditions of $$0.35\lambda \leq h \quad (3)$$

and $$0.80 < h/P \quad (4).$$

Next, the grating height h of the triangular grating will be described with reference to FIG. 8. Here, a change in reflectance when the grating pitch P of the triangular grating is kept to 0.35 μm and the grating height h is changed is simulated. FIG. 8 shows a simulation result in the case where the S polarized light flux (the light flux having the polarization plane in the paper surface of FIG. 1) is incident into the scanning optical unit 6 at the incident angles θ=0°, 30°, and 45°.

As is apparent from the result, reflectance is very large with respect to light fluxes at θ=45° in the case of h<0.25 μm and reflectance is reduced to 1% or less in which refection light can be substantially neglected in the case where h is nearly equal to 0.58 μm. At this time, h=0.58 μm, P=0.35 μm, and λ=0.78 μm.

Therefore, h/λ is nearly equal to 0.74 and h/P is nearly equal to 1.66, so that the above-mentioned conditional expressions (3) and (4) are satisfied.

Also, as is apparent from FIG. 8, the performance is improved as the grating height h increases. In addition, as is apparent from FIG. 5, when the grating pitch is made larger than 0.35 μm, the fine structural grating does not function as the zero order grating. Accordingly, it is desirable that the grating pitch is equal to or smaller than 0.35 μm. Thus, it is apparent that the above-mentioned conditional expressions (3) and (4) are established.

Further, as is apparent from FIG. 8, when θ is limited to a range of 0° to 30°, even if h≧0.3 μm, a preferable antireflection effect in which reflectance is 1% or less can be obtained. At this time, h=0.3 μm, P=0.35 μm, and λ=0.78 μm.

Therefore, h/λ becomes nearly equal to 0.38 and h/P becomes nearly equal to 0.86, thereby satisfying the above-mentioned conditional expressions (3) and (4).

In addition, as is apparent from FIG. 8, in h≧0.7 μm, reflectance becomes 0.5% or less when θ is in a range of 0° to 45°, so that an extremely preferable antireflection effect can be obtained. At this time, h=0.7 μm, P=0.35 μm, and λ=0.78 μm.

Therefore, h/λ becomes nearly equal to 0.90 and h/P becomes nearly equal to 2.0, thereby satisfying the above-mentioned conditional expressions (3) and (4).

Note that, in this embodiment, it is more preferable that the above-mentioned conditional expressions (3) and (4) are respectively changed to $$0.82\lambda \leq h \quad (3a)$$

and $$1.82 < h/P \quad (4a).$$

In this embodiment, the fine structural grating is optimized such that changes in transmittance of the S polarized light in zero order light become smaller regardless of the incident angle.

An upper limit value in the conditional expression (3) is not set. However, an increase in value tends to further improve a calculated optical performance. Note that the upper limit value becomes about 3λ because of the practical processing limitation of the grating.

An upper limit value in the conditional expression (4) is not set. However, an increase in value tends to further improve a calculated optical performance. Note that the upper limit value becomes about 10 because of the practical processing limitation of the grating.

(Third Embodiment)

Figure 9:
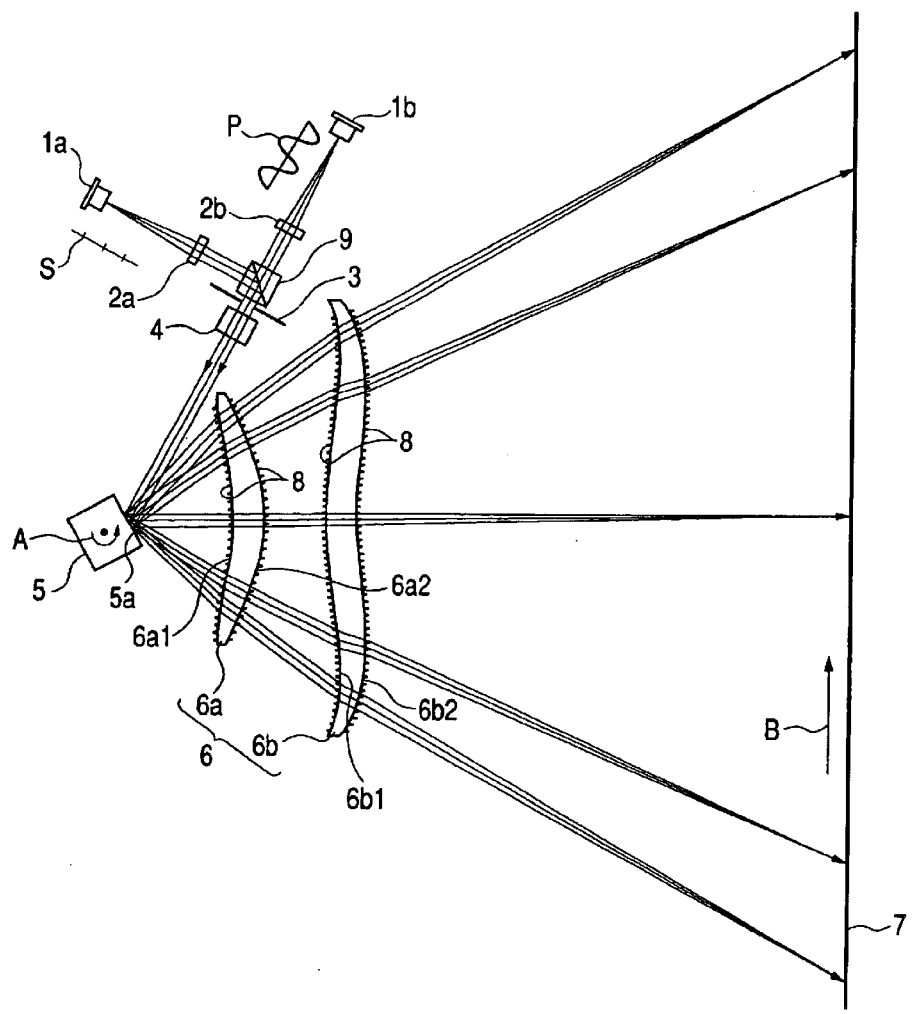
FIG. 9 is a main scanning sectional view according to a third embodiment of the present invention.
Figure 10:
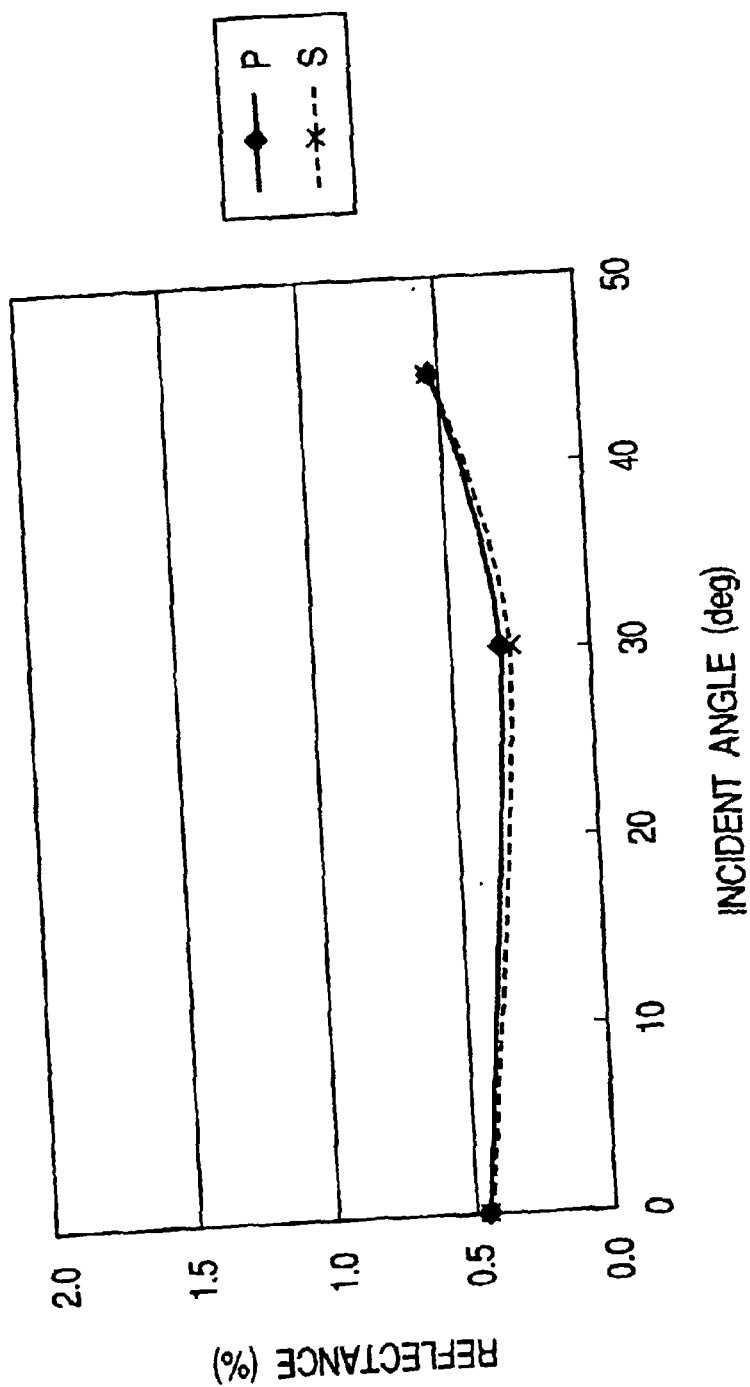
FIG. 10 shows a relationship between an incident angle and reflectance according to the third embodiment of the present invention.

FIG. 9 is a main part sectional view in a main scanning direction (main scanning sectional view), according to a third embodiment of the present invention. FIG. 10 shows a relationship between an incident angle and reflectance in the third embodiment of the present invention. In FIG. 9, the same reference numerals are provided to the same elements as shown in FIG. 1.

In this embodiment, structures different from the above-mentioned first embodiment are that (I) the light source unit 1 is composed of at least two light source sections 1a and 1b emitting different polarized light fluxes, (II) a beam combining unit 7 for combining the polarized light fluxes on different optical paths is provided between the light source unit 1 and the deflection unit 5, and (III) the conditional expressions (5) and (6) related to the fine structural grating 8 are set according to the arrangements of the light source sections 1a and 1b and the beam combining unit 7. Other structures and optical actions are substantially the same as the first embodiment, so that the same effect is obtained.

In other words, in this embodiment, the light source unit 1 is composed of the two light source sections 1a and 1b emitting different polarized light fluxes. In addition, the beam combining unit 7 for combining the polarized light fluxes on the different optical paths is provided between the light source unit 1 and the optical deflector 5. In this case, when a shortest wavelength of wavelengths of the two light fluxes emitted from the light source unit 1 is given by λmin, respective elements are set so as to satisfy conditions of $$0.35\lambda\min \leq h \quad (5) \text{ and}$$

$$0.80 < h/P \quad (6).$$

In this embodiment, the light source sections (laser light sources) 1a and 1b in FIG. 9 are respectively composed of, for example, a semiconductor laser and emit light fluxes having the same wavelength (λmin=780 nm). Collimator cylindrical lenses 2a and 2b each have predetermined refracting power in only the main scanning direction and are disposed corresponding to the light source sections 1a and 1b. The respective collimator cylindrical lenses 2a and 2b convert divergent light fluxes emitted from the corresponding light source sections 1a and 1b into substantially convergent light fluxes within the main scanning section. Note that, a system that converts the light fluxes into the substantially convergent light fluxes within the main scanning section is used in this embodiment. The present invention is not necessarily limited to such a system. The light fluxes may be substantially parallel light fluxes or divergent light fluxes.

The beam combining unit 9 is composed of, for example, a deflection beam splitter and combines the two light fluxes on optical paths, which are the substantially convergent light fluxes converted by the collimator cylindrical lenses 2a and 2b. Accordingly, it is necessary to arrange the divergent light fluxes emitted from the two light source sections 1a and 1b such that the polarization planes thereof are orthogonal to each other. Therefore, in the beam combining unit 7, the light flux from the light source section 1a becomes S polarized light having a polarization plane in a direction perpendicular to the paper surface, and the light flux from the light source section 1b becomes P polarized light having a polarization plane within the paper surface. Thus, the two light fluxes incident into the fine structural grating 8 are the P polarized light and the S polarized light with respect to the incident surface of the fine structural grating 8.

Note that a light source having two or more light emitting points with the same polarization plane (multi-laser light source) may be used as each of the light source sections 1a and 1b.

Although not shown in FIG. 9, a synchronous detection optical system for determining timing of a write start position of an image on the surface to be scanned (BD optical system) is provided.

In this embodiment, each of the lens surfaces of the first and the second scanning lenses 6a and 6b is formed in the curved shape such as the spherical shape or the aspherical shape within the main scanning section shown in FIG. 9. In addition, the known special aspherical shape in which curvature is changed from the on-axis (scanning center) position toward the off-axis (scanning periphery) position, within the sub scanning section perpendicular to the main scanning section is used as the base shape. In this embodiment, the fine structural grating 8 made of a transparent resin material or a glass material as described later is formed on the entire incident surface 6a1 and the entire exit surface 6a2 of the first scanning lens 6a and the entire incident surface 6b1 and the entire exit surface 6b2 of the second scanning lens 6b.

Note that, in this embodiment, the fine structural grating 8 may be provided on one optical surface having the maximum influence on ghost light and flare light that reach the surface to be scanned 7 (such as a surface in which an incident angle is maximum). In addition to this, one or plural fine structural gratings 8 may be provided. The surface on which the fine structural grating 8 is provided may be a spherical surface or an aspherical surface. In addition, the surface on which the fine structural grating 8 is provided may be a curved surface, a diffraction surface, or a flat surface, which are rotationally asymmetrical.

As shown in FIG. 3, in the fine structural grating 8, grating parts, each of which has a sectional shape of a triangle, are arranged in one dimensional direction (main scanning direction), thereby becoming a repetition structure. Note that the fine structural grating 8 may be integrally formed with a substrate composing an optical surface (glass substrate or transparent resin substrate).

The fine structural grating 8 is the so-called zero order grating and the pitch can be determined as in the case of the first embodiment.

In this embodiment, as described above, the light fluxes from the two light source sections are respectively incident into the scanning lens system 6 as the P polarized light and the S polarized light which are orthogonal to each other. Therefore, it is necessary for the fine structural grating to grasp characteristics with respect to the two polarized lights.

Next, the grating height h of the above-mentioned triangular grating will be described with reference to FIGS. 6 and 8. Here, a change in reflectance when the grating pitch P of the triangular grating is kept to 0.35 μm and the grating height h is changed is simulated. FIG. 6 shows a simulation result in the case where the P polarized light flux is incident into the scanning lens system 6 at the incident angles θ=0°, 30°, and 45° as described above. FIG. 8 shows a simulation result in the case where the S polarized light flux is incident into the scanning lens system 6 at the incident angles θ=0°, 30°, and 45° as described above.

In FIGS. 6 and 8, the influence of structural birefringence of the fine structural grating can be recognized. As compared with the characteristics of the Fresnel reflection as shown in FIG. 14, a distinction is the case where the incident angle is zero degrees. When the incident angle is zero, there is inherently no difference between reflectances of polarized light fluxes whose polarization planes are orthogonal to each other in the case shown in FIG. 14. However, in the fine structural grating having the structural birefringence as shown in FIGS. 6 and 8, even if the incident angle is zero degrees, a difference is caused between characteristics (reflectances) of the polarized light fluxes whose polarization planes are orthogonal to each other. In particular, when h<0.2 μm, the difference is remarkable. Thus, in this embodiment, it is necessary to conduct optimization based on comparison between respective characteristics of the P polarized light and the S polarized light.

As is apparent from FIGS. 6 and 8, reflectance is very large with respect to light fluxes at θ=45° in the case the S polarized light is h<0.25 μm and reflectance is reduced to 1% or less in which refection light can be substantially neglected in the case where h is nearly equal to 0.58 μm. At this time, h=0.58 μm, P=0.35 μm, and λmin=0.78 μm.
Therefore,
h/λmin is nearly equal to 0.74 and h/P is nearly equal to 1.66,
so that the above-mentioned conditional expressions (5) and (6) are satisfied.

Also, as is apparent from FIGS. 6 and 8, the performance is improved as the grating height h increases. In addition, as is apparent from FIG. 5, when the grating pitch is made larger than 0.35 μm, the fine structural grating does not function as the zero order grating. Accordingly, it is desirable that the grating pitch is equal to or smaller than 0.35 μm. Thus, it is apparent that the above-mentioned conditional expressions (5) and (6) are established.

Further, as is apparent from FIGS. 6 and 8, when θ is limited to a range of 0° to 30°, even if h≧0.3 μm, a preferable antireflection effect in which reflectances with respect to the P polarized light and the S polarized light are 1% or less can be obtained. At this time, h 0.3 μm, P=0.35 μm, and λmin=0.78 μm.
Therefore, h/λmin becomes nearly equal to 0.38 and h/P becomes nearly equal to 0.86, thereby satisfying the above-mentioned conditional expressions (5) and (6).

In addition, as is apparent from FIGS. 6 and 8, when h≧0.7 μm, reflectances with respect to the P polarized light and the S polarized light become 0.5% or less in a range of θ=0° to 45°, so that an extremely preferable antireflection effect can be obtained. At this time, h=0.7 μm, P=0.35 μm, and λmin=0.78 μm.
Therefore, h/λmin becomes nearly equal to 0.90 and h/P becomes nearly equal to 2.0, thereby satisfying the above-mentioned conditional expressions (5) and (6).

Note that, in this embodiment, it is more preferable that the above-mentioned conditional expressions (5) and (6) are respectively changed to $$0.82 \lambda \min \leq h \quad (5a) \text{ and}$$

$$1.82 < h/P \quad (6a).$$

In this embodiment, it is assumed that the two light fluxes from the light source sections 1a and 1b have the same wavelength (λmin=780 nm). However, the present invention is not limited to such a wavelength. Therefore, light fluxes having different wavelengths may be used. At this time, in view of a characteristic in which a grating pitch in the zero order grating becomes smaller as a wavelength shortens, a shorter wavelength of the two light fluxes is set to λmin, with the result that a grating shape may be determined. Of course, even when three or more beams are used, the grating pitch may be similarly determined corresponding to a shortest wavelength.

Also, in this embodiment, when the above-mentioned multi-laser light source is used as the light source unit 1 and the light flux incident into the fine structural grating 8 is substantially P polarized light, respective elements may be set so as to satisfy conditions of $$0.23 \lambda \min \leq h \quad (7) \text{ and}$$

$$0.52 < h/P \quad (8).$$

Also, when the light flux incident into the fine structural grating 8 is substantially S polarized light, similar to a case of the above-mentioned conditional expressions (5) and (6), respective elements may be set so as to satisfy conditions of $$0.35 \lambda \min \leq h \quad (9) \text{ and}$$

$$0.80 < h/P \quad (10).$$

In this embodiment, the fine structural grating is optimized such that changes in transmittances of the P polarized light and the S polarized light in zero order light become smaller regardless of the incident angle. As a result, with respect to the shape of the fine structural grating, when the use wavelength λ is set to 0.78 μm and the refraction index n of a material of the scanning lens is set to 1.524, the grating pitch P of 0.35 μm and a grating depth D of 0.70 μm are obtained. In such a grating shape, reflectance characteristics to the incident angle are shown in FIG. 10.

In other words, when the incident angle of light into the optical element is within a range of 0° to 45°, the reflectance is 0.5% or less, that is, a loss of transmittance is up to 0.5%. Therefore, it is apparent that the reflectance characteristics are greatly improved unlike the reflectance characteristics of the P polarized light and the S polarized light in the conventional example as shown in FIG. 14 and reduced to 1% or less at which the influence of flare on an image is slight.

In this embodiment, the grating pitch, the grating depth, and a grating constant are determined in order to reduce Fresnel reflection produced on each of the lens surfaces. Further, the influence of structural birefringence is eliminated. Therefore, it is possible to provide a scanning optical system in which flare light and ghost light that reach the surface to be scanned 7 can be reduced, thereby outputting a preferable image.

An upper limit value in the conditional expression (6) is not set. However, an increase in value tends to further improve a calculated optical performance. Note that the upper limit value becomes about 3λ due to the practical processing limitation of the grating.

An upper limit value in the conditional expression (6) is not set. However, an increase in value tends to further improve a calculated optical performance. Note that the upper limit value becomes about 10 due to the practical processing limitation of the grating.

(Image Forming Apparatus)

Figure 11:
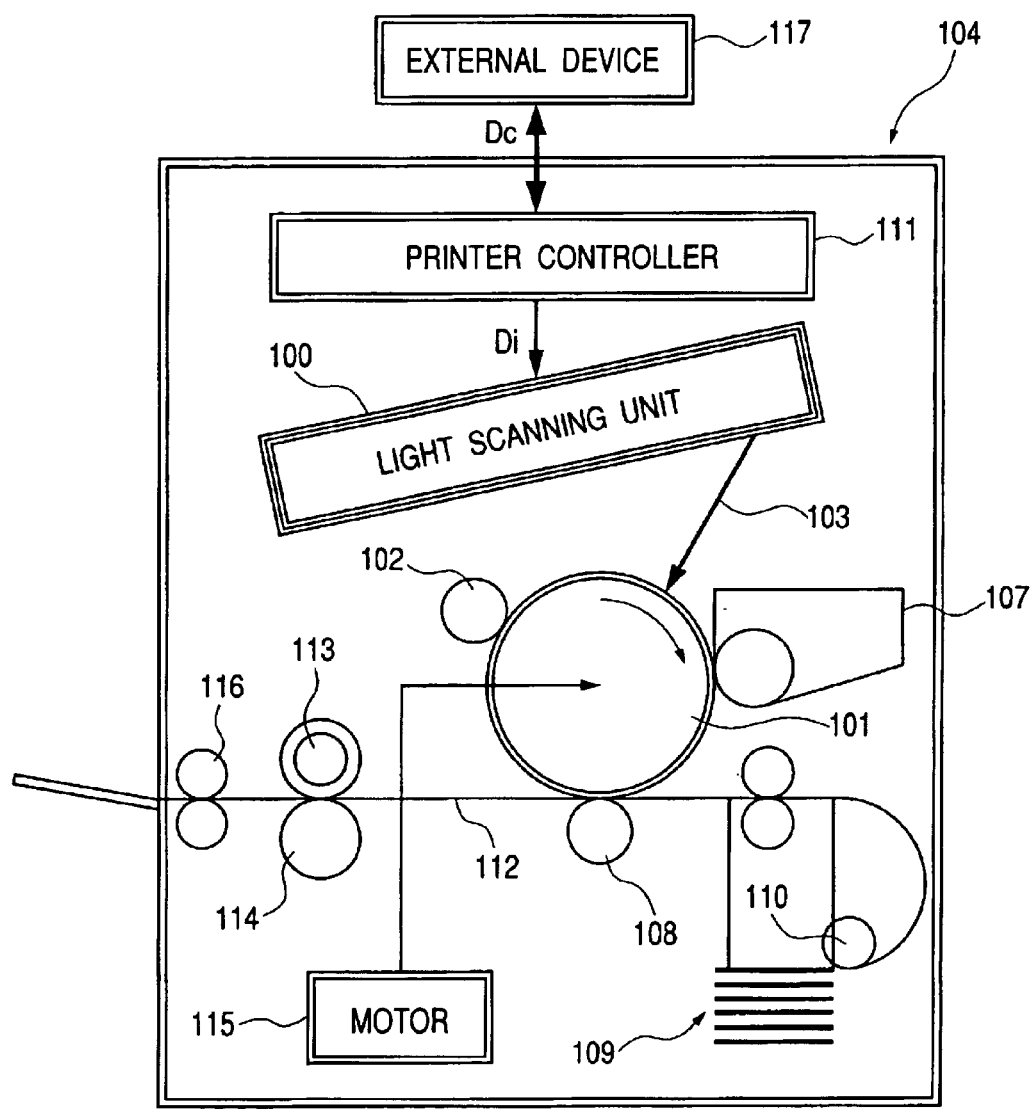
FIG. 11 is a main part schematic view showing an image forming apparatus according to an embodiment mode of the present invention.

FIG. 11 is a cross sectional view of a main portion in a sub scanning cross section showing an embodiment of an image forming apparatus (electrophotographic printer) using the scanning optical system of the above-mentioned first, second or third embodiment. In FIG. 11, reference numeral 104 designates an image forming apparatus. Code data Dc is inputted from an external device 117 such as a personal computer to the image forming apparatus 104. The code data Dc is converted into image data (dot data) Di by a printer controller 111 provided inside the apparatus. The image data Di is inputted to a scanning optical unit 100 having the construction shown in the first, second or third embodiment. Then, a plurality of light beams (light fluxes) 103 which have been optically modulated in accordance with the image data Di are emitted from the scanning optical unit (scanning optical system) 100, and a photosensitive surface of a photosensitive drum 101 is scanned in the main scanning direction with the plurality of light beams 103.

The photosensitive drum 101 as the electrostatic latent image carrier (photosensitive body) is rotated clockwise by a motor 115. Along with this rotation, the photosensitive surface of the photosensitive drum 101 is moved in the sub scanning direction perpendicular to the main scanning direction for the light beams 103. A charging roller 102 for charging electrostatically uniformly the surface of the photosensitive drum 101 is provided above the photosensitive drum 101 so as to be brought into contact with the surface of the drum 101. Then, the surface of the photosensitive drum 101 charged with electricity by the charging roller 102 is adapted to be irradiated with the plurality of light beams 103 through the scanning by the scanning optical unit 100.

As has already been described, the plurality of light beams 103 are optically modulated in accordance with the image data Di. Then, the electrostatic latent image is formed on the surface of the photosensitive drum 101 by the irradiation of the plurality of light beams 103. The electrostatic latent image is developed in the form of a toner image by a developing unit 107 which is arranged in the downstream side within the rotation cross section of the photosensitive drum 101 with respect to the position of irradiation of the plurality of light beams 103 so as to be brought into contact with the photosensitive drum 101.

The toner image developed by the developing unit 107 is transferred onto a sheet 112 as a material on which the toner image is to be transferred by a transfer roller (transfer unit) 108 which is provided below the photosensitive drum 101 so as to face the photosensitive drum 101. While the sheets 112 are received in a sheet cassette 109 provided forwardly with respect to the photosensitive drum 101 (on the right side in FIG. 11), the sheet can also be manually fed. A sheet feed roller 110 is arranged at the end portion of the sheet cassette 109 and adapted to send the sheet 112 in the sheet cassette 109 to a conveying path.

The sheet 112 has been transferred is further conveyed to a fixing unit provided backward with respect to the photosensitive drum 101 (on the left side in FIG. 11). The fixing unit is constituted by a fixing roller 113 having in its inside a fixing heater (not shown) and a pressure roller 114 which is provided so as to pressure-contact with the fixing roller 113. Then, the sheet 112 on which the unfixed toner image conveyed from the transfer unit is heated while being pressed in the pressure contact portion between the fixing roller 113 and the pressure roller 114 to thereby fix the unfixed toner image on the sheet 112. Furthermore, a pair of sheet discharge rollers 106 are provided backward with respect to the fixing roller 113 and adapted to discharge the sheet 112 having the fixed toner image to the outside of the image forming apparatus.

While not illustrated in FIG. 11, the print controller 111 carries out not only the conversion of the data as has already been described, but also the control for portions in the image forming apparatus, including a motor 115, and a polygon motor and the like in the scanning optical unit 100.

(Color Image Forming Apparatus)

Figure 12:
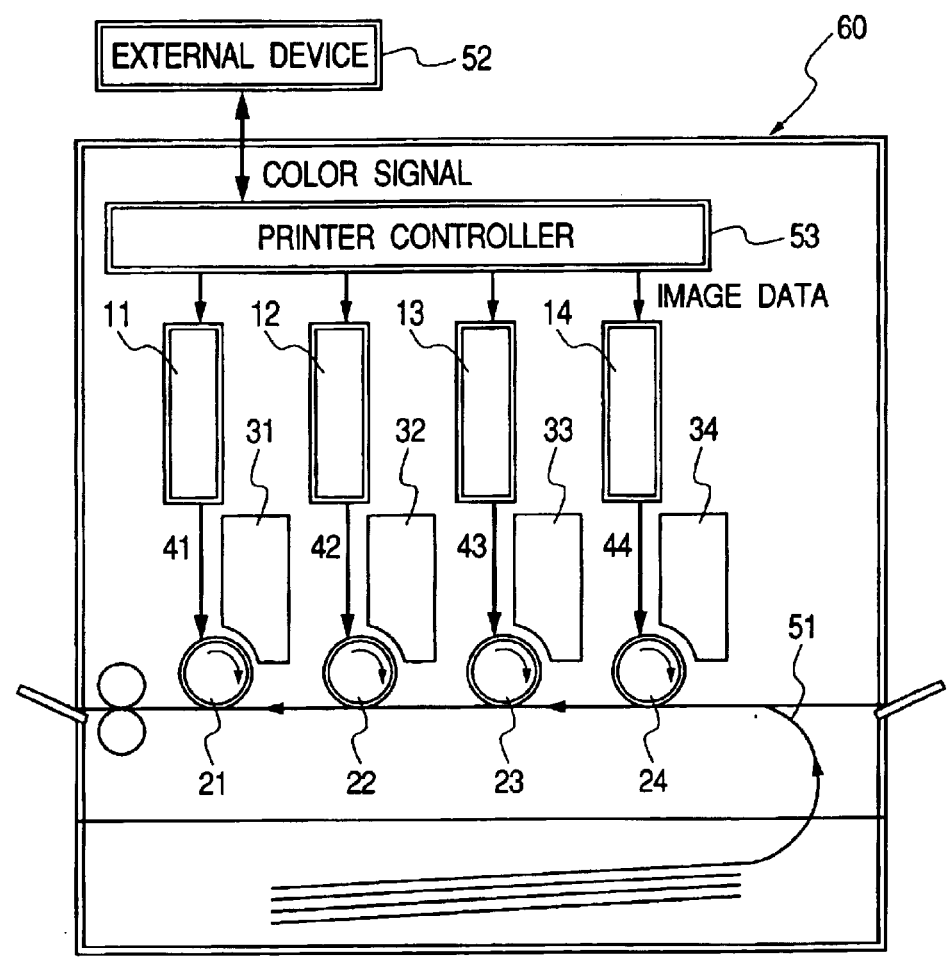
FIG. 12 is a main part schematic view showing a color image forming apparatus according to the embodiment mode of the present invention.
Figure 13:
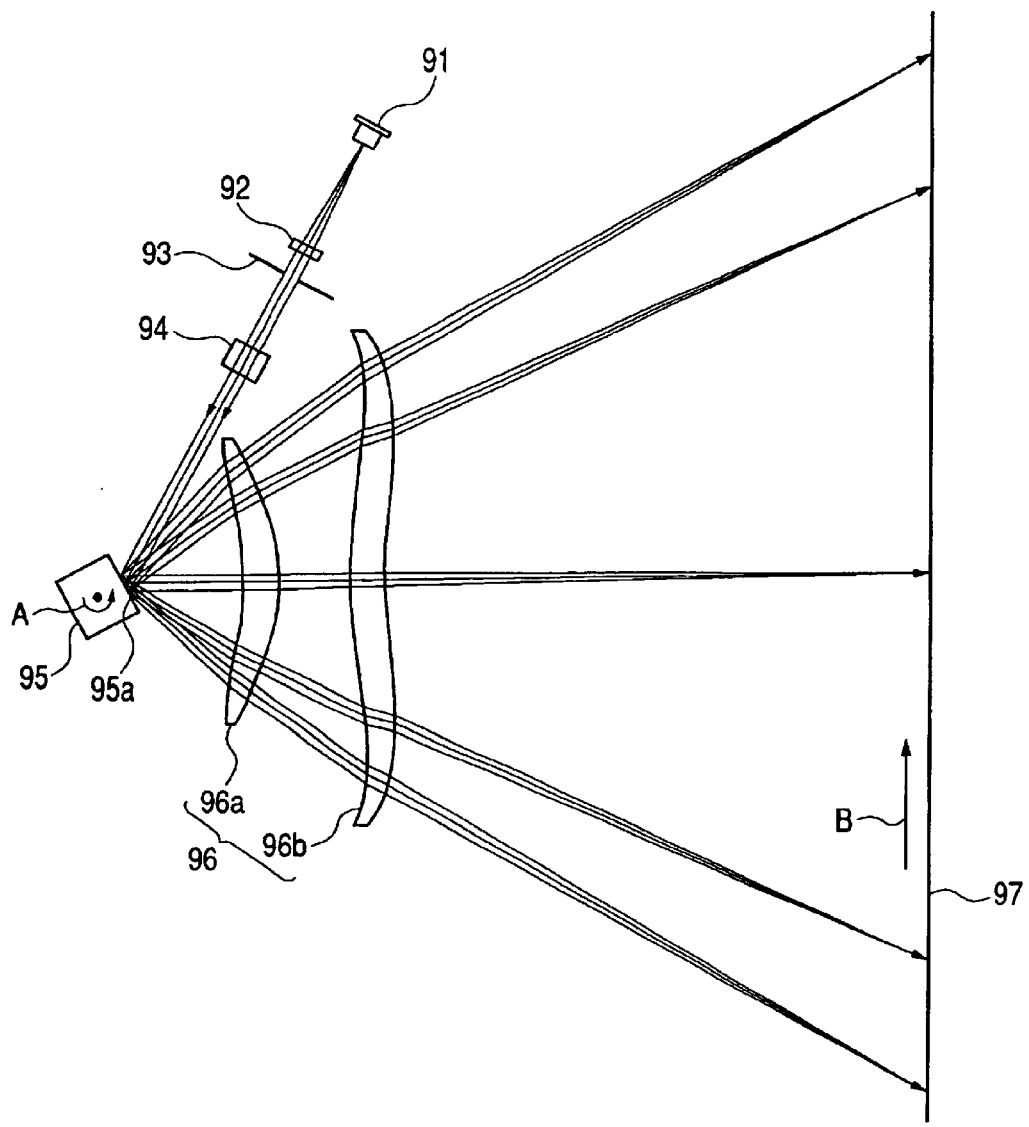
FIG. 13 is a main scanning sectional view of a conventional scanning optical system.

FIG. 12 is a schematic view of a main portion of a color image forming apparatus according to an embodiment of the present invention. The present embodiment relates to a tandem type color image forming apparatus in which four scanning optical systems (scanning optical apparatuses) are arranged to record image information on the surfaces of four photosensitive drums as image carriers which are arranged in parallel with the scanning optical apparatuses, respectively. In FIG. 12, reference numeral 60 designates a color image forming apparatus, reference numerals 11, 12, 13 and 14 respectively designate scanning optical apparatuses each having any one of the constructions described in the first, second and third embodiment, reference numerals 21, 22, 23 and 24 respectively designate photosensitive drums as image carriers, reference numerals 31, 32, 33 and 34 respectively designate developing units, and reference numeral 51 designates a conveying belt.

In FIG. 12, color signals R(red), G(green) and B(blue) are inputted from an external device 52 such as a personal computer to the color image forming apparatus 60. These color signals are converted into image data of C(cyanogen), M(Magenta), Y(yellow) and B(black) by a printer controller 53 within the apparatus. The image data are inputted to the scanning optical apparatuses 11, 12, 13 and 14, respectively. A plurality of light beams 41, 42, 43 and 44 which have been modulated in accordance with the image data are emitted from the scanning optical apparatuses, respectively, and then the photosensitive surfaces of the photosensitive drums 21, 22, 23 and 24 are scanned in the main scanning direction with the plurality of light beams.

In the color image forming apparatus of the present embodiment, the four scanning optical apparatuses 11, 12, 13 and 14 are arranged, and the image signals (image information) are recorded on the photosensitive surfaces of the photosensitive drums 21, 22, 23 and 24 which are arranged in parallel with the scanning optical apparatuses 11, 12, 13 and 14, respectively, so as to correspond to C(cyanogen), M(Magenta), Y(yellow) and B(black) to print the color image at high speed.

In the color image forming apparatus of the present embodiment, as described above, the latent images of the four colors are formed on the photosensitive surfaces of the corresponding photosensitive drums 21, 22, 23 and 24 using a plurality of light beams based on the image data by the four scanning optical apparatuses 11, 12, 13 and 14. Thereafter, the latent images are transferred on a recording material in a multiplex manner to form a full color image on a single sheet.

As for the above-mentioned external device 52, for example, a color image reader including a CCD sensor may be used. In this case, a color digital copying machine is constituted by this color image reader and the color image forming apparatus 60.

According to the present invention, as described above, the optical element in which the fine structural grating is provided having the structure for adjusting a change in the amount of transmission light, caused by changing the incident angle of the light flux from a central region to a peripheral region, is applied to the scanning optical system. Accordingly, a change in the amount of transmission light, caused by changing the incident angle of the light flux can be easily adjusted. In particular, it is possible to achieve a scanning optical system in which the influence of structural birefringence resulting from a relationship between the arrangement direction of the fine grating structure and the polarization planes can be reduced to obtain a preferable optical performance, and to achieve an image forming apparatus using the scanning optical system.

In addition, according to the present invention, as described above, it is possible to achieve a scanning optical system in which Fresnel reflection on a lens surface which causes flare and ghost can be reduced to make a uniform light quantity distribution on the surface to be scanned without providing an additional step such as coating, and to achieve an image forming apparatus using the scanning optical system.

In addition, according to the present invention, as described above, it is possible to achieve a scanning optical system in which a substantially uniform illumination distribution can be made in a wide region on an image, and an image forming apparatus using the scanning optical system.

What is claimed is:

1. A scanning optical system comprising:
   light source means for emitting a light flux;
   deflection means for deflecting the light flux emitted from the light source means; and
   scanning optical means for guiding the light flux deflected by the deflection means onto a surface to be scanned and scanning the surface, the scanning optical means including a fine structural grating on at least one optical surface thereof,
   wherein the fine structural grating has a triangular grating in which a plurality of triangular grating parts are arranged in one dimensional direction, and
   wherein when a grating height of a triangular structure of the triangular grating is given by h, a grating pitch thereof is given by P, and a wavelength of the light flux emitted from the light source means is given by λ, conditions of $0.23\lambda \leq h$ and $0.52 < h/P$ are satisfied.

2. A scanning optical system according to claim 1, wherein a light flux incident into the fine structural grating is substantially P polarized light.

3. A scanning optical system according to claim 1, wherein when a light flux incident into the fine structural grating is substantially S polarized light, conditions of $0.35\lambda \leq h$ and $0.80 < h/P$ are satisfied.

4. A scanning optical system comprising:
   a light source means for emitting a plurality of light fluxes;
   deflection means for deflecting the plurality of light fluxes emitted from the light source means; and
   scanning optical means for guiding the plurality of the light fluxes deflected by the deflection means onto a surface to be scanned and scanning the surface, the scanning optical means including a fine structural grating on at least one optical surface thereof,
   wherein the fine structural grating has a triangular grating in which a plurality of triangular grating parts are arranged in one dimensional direction, and
   wherein when a grating height of a triangular structure of the triangular grating is given by h, a grating pitch thereof is given by P, and a shortest wavelength of wavelengths of the plurality of light fluxes emitted from the light source means is given by λmin, conditions of $0.23\lambda\text{min} \leq h$ and $0.52 < h/P$ are satisfied.

5. A scanning optical system according to claim 4, wherein a light flux incident into the fine structural grating is substantially P polarized light.

6. A scanning optical system according to claim 4, wherein when a light flux incident into the fine structural grating is substantially S polarized light, conditions of $0.35\lambda\text{min} \leq h$ and $0.80 < h/P$ are satisfied.

7. A scanning optical system according to claim 4, wherein:
   the light source means includes a plurality of light source sections for emitting different polarized light fluxes;
   the scanning optical system further comprises a beam combining means for combining the different polarized light fluxes on optical paths, the beam combining means being located between the light source means and the deflection means; and
   conditions of $0.35\lambda\text{min} \leq h$ and $0.80 < h/P$ are satisfied.

8. An image forming apparatus comprising:
   a scanning optical system according to claim 1;
   a photosensitive member located on a surface to be scanned;
   a developing unit for developing as a toner image an electrostatic latent image formed on the photosensitive member by the light flux for scanning from the scanning optical system;
   a transferring unit for transferring the developed toner image to a material to be transferred; and
   a fixing unit for fixing the transferred toner image to the material to be transferred.

9. An image forming apparatus comprising:
   a scanning optical system according to claim 1; and
   a print controller for converting code data inputted from an external device into an image signal and inputting the image signal to the scanning optical system.

10. A color image forming apparatus comprising:
    a plurality of scanning optical systems according to claim 1; and
    a plurality of image bearing members, each of which is located on a surface to be scanned, of a corresponding scanning optical system, the plurality of image bearing members forming images having colors different from one another.

11. A color image forming apparatus according to claim 10, further comprising a print controller for converting a color signal inputted from an external device into image data corresponding to different colors and for inputting the image data to the respective scanning optical systems.

* * * * *

UNITED STATES PATENT AND TRADEMARK OFFICE
CERTIFICATE OF CORRECTION

PATENT NO. : 6,885,486 B2
DATED : April 26, 2005
INVENTOR(S) : Kazumi Kimura

It is certified that error appears in the above-identified patent and that said Letters Patent is hereby corrected as shown below:

<u>Column 8,</u>
Line 65, "$P(Ns·sin\ \theta m·Ni-sin\ \theta i)=m\lambda$" should read -- $P(Ns·sin\theta m - Ni·sin\theta i)=m\lambda$ --.

Signed and Sealed this

Fourth Day of October, 2005

JON W. DUDAS
*Director of the United States Patent and Trademark Office*